May 3, 1966 E. H. SHEFTELMAN 3,249,868
PHASE MEASURING OF NOISE-CONTAMINATED SIGNAL
Filed March 7, 1963 2 Sheets-Sheet 1

INVENTOR.
EUGENE H. SHEFTELMAN
BY
Kenway, Jenney & Hildreth
ATTORNEYS

INVENTOR.
EUGENE H. SHEFTELMAN
BY
Kenway, Jenney & Hildreth
ATTORNEYS

United States Patent Office 3,249,868
Patented May 3, 1966

3,249,868
PHASE MEASURING OF NOISE-CONTAMINATED SIGNAL
Eugene H. Sheftelman, Nashua, N.H., assignor to Northrop Corporation, Beverly Hills, Calif., a corporation of California
Filed Mar. 7, 1963, Ser. No. 263,661
4 Claims. (Cl. 324—83)

This invention relates in general to the measurement of phase and particularly to the measurement of phase of a signal which is contaminated by noise.

Conventionally, phase of a signal is measured by using what may be termed the null technique. The null techique involves the shifting of the phase of the signal whose phase is being measured until a device such as a phase detector indicates that the signal is in quadrature with a reference signal. Such a point is, of course, indicated by the null output. Alternatively, the phase of the reference signal may be shifted relative to that of the signal until a null output is obtained. In a simple system, the amount of phase shift required to reach null is read from a dial driven by the shaft of the phase shifter. In more sophisticated systems, a servo motor energized by the output of the phase detector drives the phase shifting device to the point of null output.

There are several disadvantages associated with the null technique which is described above. As is described in greater detail below, these disadvantages are aggravated when the signal whose phase is to be measured is contaminated by noise. Perhaps the greatest disadvantage of the null technique stems from the requirement for a phase shifting element of a mechanical nature. Commonly, a resolver or a sine-cosine potentiometer is utilized as the phase shifting element. Such devices must be driven by torquing devices such as a servo motor, which is usually possible only if a gear train is interposed. The torquing device, of course, requires some power for its operation, and as a result, it is necessary to energize it from a power amplifier. Obviously, the mechanical phase shifting element, the torquing device, the gear train and the power amplifier add up to a mass of equipment which is large, complex and expensive.

A second disadvantage which is encountered in utilizing the null technique of phase measurement is related to the amount of time it takes for the servo mechanism to reach a new value of phase. This time is determined by the amount of smoothing or noise rejection provided in the system. If smoothing or noise rejection is maximized, a noise-free result may be obtained, but the time which the servo mechanism takes to reach a new value of phase is correspondingly maximized. The reason for this relationship is found in the fact that the servo mechanism must be designed with some value of damping.

Consider, for example, the situation where the receiver through which it is customary for the signal to pass before reaching the phase detector is a linear device with automatic gain control. The gain control may be derived in such a way that the signal level remains approximately constant while the signal-to-noise ratio decreases. In that case, the damping of the servo remains constant also, and must be selected with the worst signal-to-noise ratio in mind. Consequently, even though a speedy response to a phase change is possible and desirable when the signal-to-noise ratio is large, the servo is constrained to respond at the slowest speed for all conditions.

The automatic gain control of the receiver may be designed to hold the output noise level constant and decrease the signal when the signal-to-noise ratio decreases. In this case, the damping is less for large signal-to-noise ratios, which is a desired result. However, such a variation of damping frequently introduces a stability problem in the design of the servo.

There are other phase measuring systems in which the output of a phase detector is average. Such an average output is a function of phase, and techniques and systems have been set up based upon such concepts to provide phase measurements. However, the magnitude of the average output of the phase detector is not only a function of phase, but it is also a function of the signal-to-noise ratio. Thus, the same disadvantages outlined above in the discussion of the null technique are equally applicable to the averaging technique when it is desired to measure the phase of signals having a wide range of signal-to-noise ratios.

It is, therefore, a primary object of the present invention to improve the measurement of phase.

It is another object of the present invention to measure the phase of a signal by a technique which is unaffected by the signal-to-noise ratio of the signal.

It is a further object of the present invention to provide a phase measuring system and technique which is self-adaptive to changes in the signal-to-noise ratio over the range of signals being measured.

Generally, the apparatus of the present invention includes a pair of phase detectors which are driven in quadrature by separate reference voltages. The ratio of the average outputs of the pair of phase detectors is measured to provide an indication of phase displacement. The two phase detectors are, of course, supplied with the same input signal. More specifically, the average outputs from the pair of phase detectors are compared in a threshold device to indicate their ratio. This ratio is a function of the phase displacement of the input signal which is applied to the two phase detectors, and the resulting measurement is independent of the signal-to-noise ratio of that input signal. Also, in the system of the present invention, response to a change of phase of the signal being measured is inherently fast for large signal-to-noise ratios and slow for small signal-to-noise ratios, yet there are no problems of loop stability in its design. For a better understanding of the present invention together with other and further advantages and features, the following specification should be read in connection with the appended drawings, in which:

Figure 1:
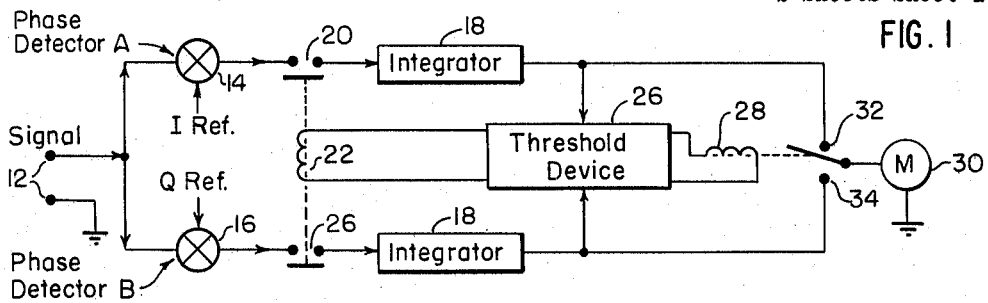
FIG. 1 is a simplified block diagram of the system.

In the block diagram of FIG. 1, there is shown an input terminal 12 to which the signal whose phase is to be measured is applied. The input terminal 12 is connected directly to a first phase detector 14 and to a second phase detector 16. A source of reference voltage I is applied to the phase detector 14, and a source of reference voltage Q is applied to the phase detector 16. The reference voltages I and Q are identical in wave form, but are in quadrature.

The output of the phase detector 14 is applied to an integrator 18 through the contacts 20 of a solenoid-controlled switch. Similarly, the output of the phase detector 16 is applied to an integrator 24 through another set of contacts 26 of the same solenoid-controlled switch. The outputs of both integrators 18 and 24 are passed to a threshold device 26. In the threshold device 26, the output of each of the integrators 18 and 24 is compared with a positive and negative threshold of equal magnitude. The threshold device 26 is connected to a solenoid or relay coil 28. When the magnitude of the output of either integrator 18 or integrator 24 becomes equal to the threshold voltage, the relay 28 is actuated to connect the meter 30 to either the contact 32 or the contact 34 of the relay. The integrator 18 is connected to the contact 32, and the integrator 24 is connected to the contact 34.

The operation of the threshold device 26 is such that whenever the magnitude of the output of either integrator 18 or 24 becomes equal to the threshold voltage, the relay is operated in such a way that the meter is connected to the integrator whose output is of less magnitude than that of the threshold.

The threshold device is also connected to the relay coil 22 which operates the switch contacts 20 and 26. Simultaneously, with the switching of the meter 30 into circuit with one of the integrators, the inputs to both integrators are cut off by the action of relay coil 22 which opens the switch contacts 20 and 26. With no further input to the integrators, a constant output is maintained. The phase is then read directly from the meter. When it is desired to take a new reading of phase measurement, the integrators are discharged, and the relay 22 is actuated to reclose the contacts 20 and 26.

Figure 2:
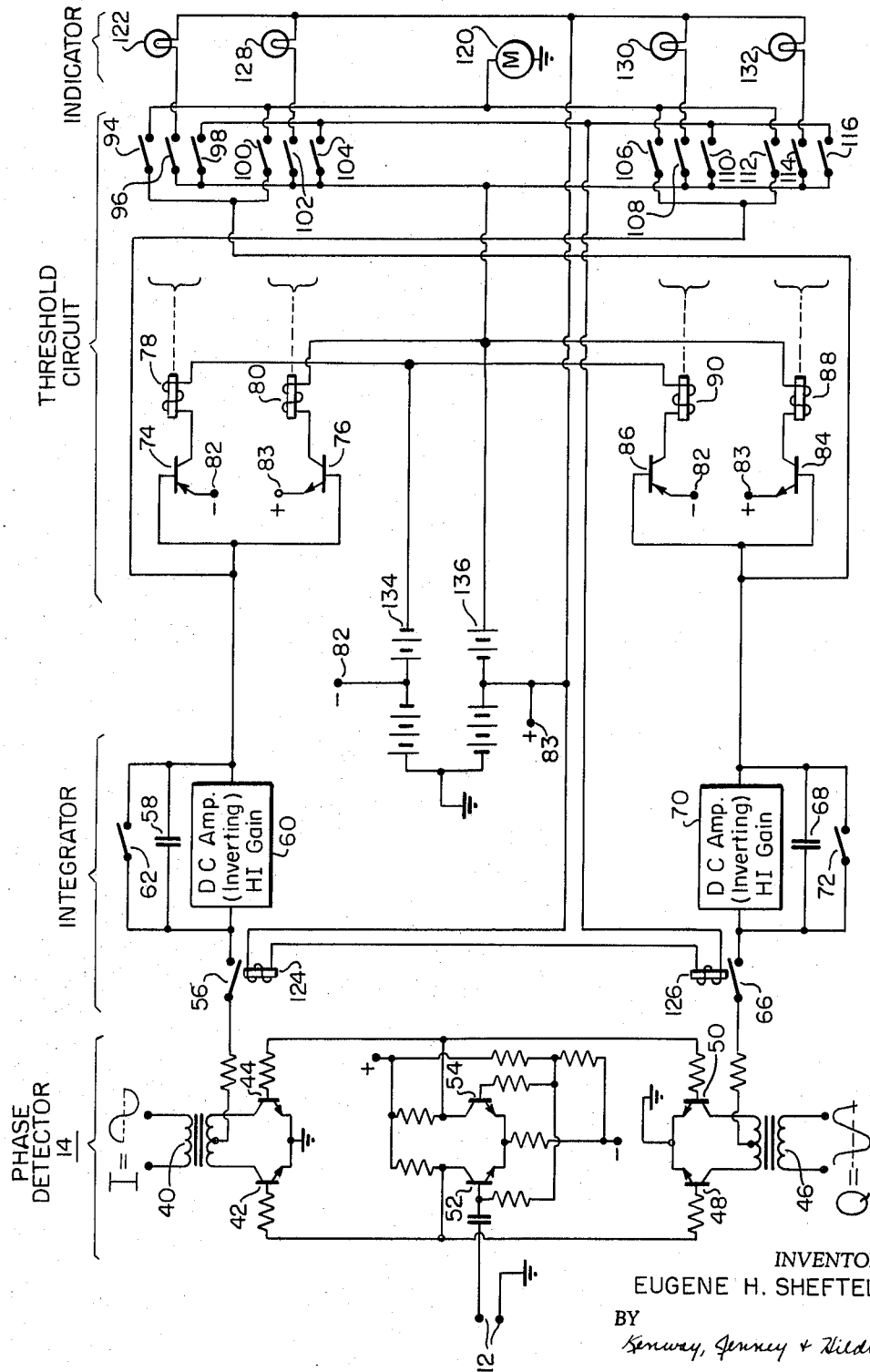
FIG. 2 is a specific circuit confroming to the block diagram of FIG. 1.

In the specific circuit of FIG. 2, the phase detector 14 which is fed from the input terminal 12 includes an input transformer 40, to which the I reference signal is applied. One end of the secondary of the input transformer 40 is connected to the collector of a transistor 42 and the other end to the collector of a transistor 44. A center tap is provided on the secondary as an output, the purpose of which is explained hereinafter. In similar fashion, an input transformer 46 for the Q reference signal is connected to the collectors of a pair of transistors 48 and 50.

The input signal, preferably in hard-limited condition, is applied to the terminals 12 and coupled through a condenser to the bases of transistors 52 and 54. In the transistors 52 and 54, the input signals are converted in a conventional manner to push-pull form by the phase-inverting amplification provided by the transistors. The signals are then applied to the bases of the previously mentioned transistors 42, 44, 48 and 50.

Considering first the transistors 42 and 44, with the input signal being applied in push-pull, the transistor 42 is driven to saturation at the same time that the transistor 44 is cut off. Conversely, when the transistor 44 is driven to saturation, the transistor 42 is cut off. Thus, when the instantaneous amplitude of the input signal is greater than zero, one end of the secondary of the input transformer 40 is effectively grounded through one of the transistors 42 and 44. At the same time the other end of the secondary is floating. When the instantaneous amplitude of the input signal is less than zero, conditions reverse, and the opposite end of the secondary of the input transformer 40 is effectively grounded through one of the transistors.

The reference signal I is shown as a sinusoidal wave, but, of course, other wave forms such as a square wave might also be used. This signal is applied to the primary of the input transformer 40 with the result that the average value $\bar{e}_I$ of the voltage between the center tap of the secondary of transformer 40 and ground is related to the phase ($\theta$) between the reference signal and the input signal in accordance with the following:

$$\bar{e}_I = E \cos \theta$$

where E is a constant.

A similar arrangement and operation are found in connection with the input transformer 46 and the transistors 48 and 50. The Q reference voltage applied to the primary of the transformer 46 is identical to the I reference voltage except that the Q reference voltage is in phase quadrature with the I reference voltage. Therefore, the relationship of the average value of the voltage between the center tap of the secondary of the transistor 46 and ground is related to the phase ($\theta$) between the Q reference voltage and the input signal as follows:

$$\bar{e}_Q = E \sin \theta$$

The output of the I phase detector is taken from the center tap of the transformer 40 and is applied to the swinging contact of a switch 56. The switch 56 is normally closed with its coil D energized. The signal coming through the switch 56 is integrated with respect to time by an integrator which consists of a condenser 58 connected between the input and output of a high-gain inverting D.C. amplifier 60. The amplifier has a high input impedance and a low output impedance. A normally closed switch 62 is connected across the condenser 58.

The amplifier 60 is of the type generally known as operational amplifiers, and its design is such that when the switch 62 is closed, the voltage between the input and ground is held near zero by the feedback path through the switch 62. Accordingly, the output is also close to ground potential.

The output of the phase detector to which the Q reference is applied is taken from the center tap on the secondary of the transformer 46. It is applied to a circuit which is entirely similar to that to which the output of the I reference detector is applied. In this instance, a switch 66, a condenser 68, an operational amplifier 70, and a switch 72 are identical to and perform the same functions as their counterparts 56, 58, 60 and 62. The output of one of the integrators taken from one of the operational amplifiers 60 is applied to the threshold circuit.

The threshold circuit includes two transistors 74 and 76. The collectors of these two transistors are connected to the relay coils 78 and 80, respectively. Each of the transistors is biased by connecting it to a suitable voltage source. The transistor 74 may be a PNP transistor which has its emitter connected to a voltage source 82 which provides a biasing voltage $-V_t$. The transistor 76 may be an NPN transistor which is biased by having its emitter connected to a voltage source 83 which provides a voltage $+V_t$. Parenthetically, it may be noted that $V_t$ may be of the order of magnitude of about 30 volts, although proper operation in accordance with the principles of the present invention may be achieved without adhering to any such specific voltage.

In the same manner, the output of the operational amplifier 70 of the integrator is applied to transistors 84 and 86, the collectors of which are connected to relay coils 88 and 90. The emitter of the transistor 84 is connected to the source 83 of voltage $+V_t$, and the emitter of the transistor 86 is connected to the source 82 of voltage $-V_t$.

Three sets of switch contacts 94, 96 and 98 are operated by the relay coil 78. The output of the operational amplifier 70 is connected to one of the switch contacts 94. Three additional sets of switch contacts 100, 102 and 104 are operated by the relay coil 80, and the output of the operational amplifier 70 is, in this instance, connected to one of the switch contacts 100.

In the counterpart of this portion of the circuit, three sets of switch contacts 106, 108 and 110 are operated by the relay coil 90; three sets of switch contacts 112, 114 and 116 are operated by the relay coil 88, and the output of the operational amplifier 60 is connected to one of the contacts 106 and one of the contacts 112. The fixed one of the sets of contacts 94, 100, 106 and 112 is connected to a meter 118, the other side of which is grounded. The fixed one of the switch contacts 96 is connected through a lamp 122 back through relay coils 124 and 126 to the fixed one of the contacts 98, 104, 110 and 116. The fixed one of the contacts 102 is connected through a lamp 128 through the same relay coils 124 and 126 and back to the previously listed fixed contacts. The fixed one of the contacts 108 is connected through a lamp 130 back through the same circuit as is the fixed one of the contacts 114 connected through a lamp 132 back through the same circuit.

A source of negative voltage 134 is connected through the relay coil 78 to the collector of the transistor 74 and also through the relay coil 90 to the collector of the transistor 86. This source serves as a power supply for the actuation of relays 78 and 90. A source of positive voltage 136 is connected through the relay coil 80 to the collector of the transistor 76 and through the relay coil 88 to the collector of the transistor 84. This source serves as a power supply for the actuation of relays 80 and 88 and lamps 122, 128, 130 and 132. Thus, the movable ones of the contacts 96, 98, 102, 104, 108, 110, 114 and 116 are connected in parallel to the voltage source 136.

In operation, a phase reading is taken by first opening the switches 62 and 72. Opening of these switches permits the integrators to commence the integration of the outputs of the two phase detectors. If it be assumed that the output of the I integrator, that is the output of the operational amplifier 60, achieves a voltage which is more positive than the voltage $+V_t$, which is presently upon the emitter of the transistor 76, the transistor conducts and current passes through the relay coil 80 to close the contacts 100, 102 and 104. Only a fraction of a volt in excess of $+V_t$ need be provided by the operational amplifier 60 for the transistor 76 to be turned on.

When the contacts 100 close, the output of the operational amplifier 70 is connected to the meter 120. The meter 120 is a zero-centered voltmeter having four non-linear scales calibrated in degrees. Closing of the contacts 102 permits the flow of current through the lamp 128 to indicate the meter scale from which the phase reading should be taken by the operator. Closing of the contacts 104 permits the flow of current from the voltage source 136 through the relay coils 124 and 126. The flow of current in the relay coil 124 causes the switch contacts 56 to open, and the flow of current in the relay coil 126 causes the switch contacts 66 to open. The contacts disconnect the integrators from their associated phase detectors, and integration accordingly ceases. The open-loop input impedance of the operational amplifiers 60 and 70 is sufficiently high that the charges stored on the condensers 58 and 68 leak away very slowly. Thus, the integrator outputs do not vary for a considerable period. In fact, discharge time constants as great as a week may be readily obtained.

Assuming that the output of the operational amplifier 60 becomes more negative than $-V_t$ by as little as a fraction of a volt, the transistor 74 is turned on causing a flow of current through the relay coil 78. In this situation, the contacts 94, 96 and 98 are closed, and functions similar to those described above are performed. However, in this instance, the lamp 122 is energized by the flow of current through its filament. The operator is thus informed that a different scale of the meter 120 must be read.

Now, on the other hand, if the output of the operational amplifier 70 reaches a voltage which is more positive than $+V_t$ by a fraction of a volt, the transistor 84 conducts, and current flows through the relay coil 88, causing the contacts 112, 114 and 116 to close. In the manner similar to that described above, the output of the operational amplifier 60 is connected to the meter 120, and the lamp 132 is lit, indicating to the operator the proper scale of the meter 120 to be read.

Finally, if the output of the operational amplifier 70 reaches a voltage which is more negative than $-V_t$ by a fraction of a volt, a transistor 86 commences to conduct and current passes through the relay coil 90 to cause the contacts 106, 108 and 110 to close. Again, the output of the operational amplifier 60 is connected to the meter 120, and in this instance, the lamp 130 is lit to inform the operator which of the scales of the meter should now be read.

The average voltage output of a phase detector will be defined as the average of the output over one-half cycle of the reference:

(1) $$\bar{e}_Q = \frac{W}{2} \int_{-\pi/2w}^{\pi/2w} [E_s \sin(wt+\theta) + e_N(t)]dt$$

(2) $$\bar{e}_I = \frac{W}{2} \int_{-\pi/2w}^{\pi/2w} [E_s \cos(wt+\theta) + e_N(t)]dt$$

where the signal voltage is $E_s \sin(wt-\theta)$ and the noise voltage is $e_N(t)$. If noise is absent, (3) $$\bar{e}_Q = E_s \sin \theta$$

(4) $$\bar{e}_I = E_s \cos \theta$$

Figure 3:
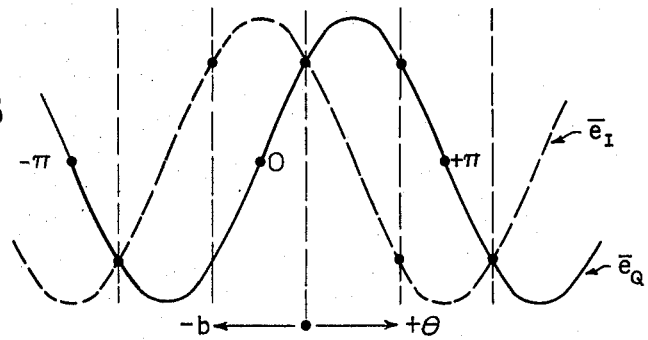
FIG. 3 is a plot of the average voltage output of a phase detector.

(3) and (4) are plotted in FIG. 3.

Even though $\bar{e}_Q$ and $\bar{e}_I$ are separately integrated, and even though the signal level $E_s$ may vary as a function of time, nevertheless if the phase between signal and reference is constant during the integration time T, the ratio of the integrated signals is equal to the tangent of the phase angle.

(5) $$\frac{\int_0^T \bar{e}_Q dt}{\int_0^T \bar{e}_I dt} = \frac{\sin \theta \int_0^T E_s dt}{\cos \theta \int_0^T E_s dt} = \tan \theta$$

which is not only independent of the value $E_s$, but as will be shown later, is also independent of $n(t)$.

It would be possible to measure the ratio (5) by placing separate meters at the outputs of each integrator, and taking the ratio of the meter readings. A number of advantages accrue, however, by using one meter with a threshold circuit. The integration proceeds until either the integral of $\bar{e}_I$ or the integral of $\bar{e}_Q$ reaches one of the fixed thresholds, $+e_T$ or $-e_T$. At this time both integrators are frozen, and one of four situations exists; either (6a) $$\frac{\int_0^T \bar{e}_Q dt}{e_T} = \tan \theta, \text{ whence } \int_0^T \bar{e}_Q dt = e_T \tan \theta$$

(6b) $$\frac{e_T}{\int_0^T \bar{e}_I dt} = \tan \theta, \text{ whence } \int_0^T \bar{e}_I dt = e_T \cos \theta$$

(6c) $$\frac{\int_0^T \bar{e}_Q dt}{-e_T} = \tan \theta, \text{ whence } \int_0^T \bar{e}_Q d = e_T \cos \theta$$

(6d) $$\frac{-e_T}{\int_0^T \bar{e}_I dt} = \tan \theta, \text{ whence } \int_0^T \bar{e}_I dt = -e_T \cos \theta$$

Thus, if the meter is connected to the integrator which has *not* reached the threshold, this meter reads the value of the left side of Equation 6. Since $e_T$ is a constant, the meter thus reads $\tan \theta$ or $\cos \theta$. The scale can be calibrated in terms of $\theta$. The slope of the tangent varies greatly between $\pm 180°$, hence the scale would be extremely non-linear except for the fact that the range of measurement is always between $+45°$ and $-45°$. When the integral of $\bar{e}_I$ reaches the positive threshold, (6a) holds and the phase is between $-45°$ and $+45°$; when the integral of $\bar{e}_Q$ reaches the positive threshold, (6b) holds and the phase is between $+45°$ and $+135°$. When the integral of $\bar{e}_I$ reaches a negative threshold, (6c) holds and the phase is between $+135°$ and $+225°$; when the integral of $\bar{e}_Q$ reaches a negative threshold, (6d) holds and the phase is between +225° and +315° (or −45°). Thus, the non-linearity in the meter scale is the difference between the slope of the tangent at 0° and at 45°, or 2 to 1. The closing of the relays in the threshold circuit also actuates one of four lights, indicating to the operator what scale he should read on the meter.

There are two principal advantages in the threshold circuit technique as compared with the use of two meters. First, the operator need not compute the ratio of the two meter readings, and second, the length of time required for one of the thresholds to be reached is automatically optimized according to the amount of noise present with the signal. The latter is an important feature of this invention. If there is very little noise, integration should be fast and the threshold should be reached quickly. If there is much noise, many more samples of the signal should be integrated in order to reduce the error due to noise. Therefore, the time taken to get to the threshold should be much longer. As an example, let it be assumed that at the output of each phase detector in one second there occur 1000 independent samples of $\bar{e}_I$ or $\bar{e}_Q$ due to noise and signal. If noise is absent, each of these samples has the same values. Let it also be assumed that the value of each sample is only 1 volt whether due to noise or due to signal, and the threshold is set at 1000 volts. Thus, the threshold is reached in one second of integration.

If now the other extreme of signal-to-noise ratio is assumed, the signal will be absent. The I or Q component of noise alone has zero mean value. But there is a certain probability that noise samples of one sign will predominate and cause the integrator output to reach a threshold. The solution to the random-walk problem provides an answer. The mean value of the sum of the noise samples will be the value of one sample multiplied by the square root of the number of samples integrated. Since the threshold is 1000 volts and each sample is 1 volt, $$\sqrt{N}=1000$$

or $N=10^6$. Since 1000 samples occur each second, integration will proceed for 1000 seconds, on the average, before noise will cause the threshold to be reached in the absence of signal. If the aim of the design was to keep the phase error due to noise constant regardless of signal-to-noise ratio, it would be required that integration time be infinite for zero signal-to-noise ratio. In the example just given, the range of integration times is 1000 to 1 instead of infinity. In practical cases, some increase in error must be accepted with very low-signal-to-noise ratios, since infinite time is not available to human beings. This method of measurement is capable of trading time for accuracy automatically. Due to its power of self-adaptation, the error increases much more slowly than the signal-to-noise ratio.

Figure 4:
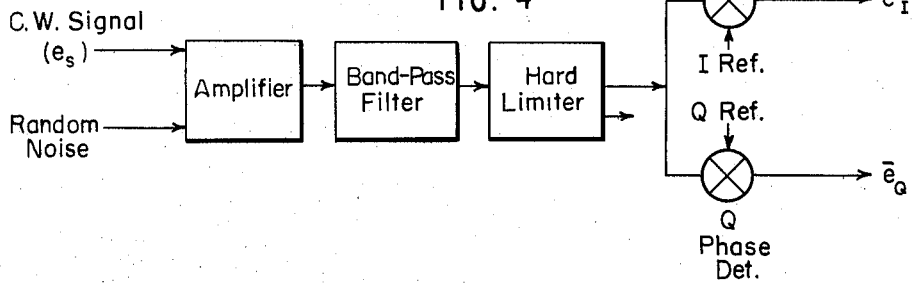
FIG. 4 is a block diagram of applicable components of a receiver useful in proving the independence from signal-to-noise ratio of the ratio of the average outputs of phase detectors driven in quadrature.

The following constitutes a proof that the ratio of the average outputs of the I and Q phase detectors are independent of signal-to-noise ratio. Referring to FIG. 4, the reference waveforms are sinusoids, I and Q being 90° out of phase with each other. The signal is the hard-limited result of the linear addition of a continuous sinusoid of the same frequency as the reference ($e_s$) and random noise. The limiter is preceded by a zonal filter with bandwidth small compared with the signal frequency.

Figure 5:
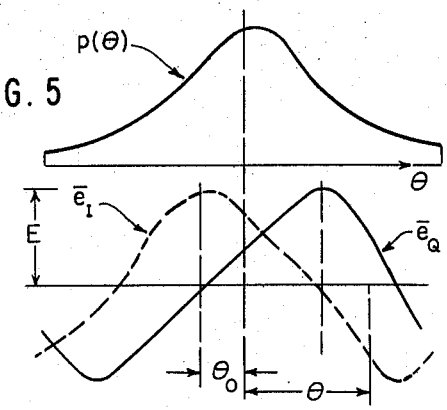
FIG. 5 is a diagrammatic representation of the probability density function of the phase of the sum of a continuous wave signal and noise, and the average outputs of the phase detectors.

The phase detector outputs $\bar{e}_I$ and $\bar{e}_Q$ are the averages (taken over one-half cycle of the reference) of the product of reference and signal. $\bar{e}_I$ and $\bar{e}_Q$ are sinusoidal functions of the phase angle $\theta$ between the hard limited input to the detector, $e_{S+N}$ and the reference, as shown in FIG. 5.

If the signal-to-noise ratio is very high, the phase angle of the signal input to the detector ($e_{S+N}$) is essentially equal to the phase angle of the cw input signal ($e_S$). But when the noise becomes appreciable, the phase of $e_{S+N}$ fluctuates and must be described by a probability density function $p(\theta)$. For Gaussian noise, the form of $p(\theta)$ is known. For examples see "Introduction to Statistical Communication Theory," Middleton, McGraw-Hill Book Co., p. 417, e.g. 9.58b. For the purpose of this discussion, the form of the distribution is immaterial, as long as it is an even function of $\theta$. Since $p(\theta)$ vanishes beyond $-\pi$ and $+\pi$ by definition, and sine $\theta$, cos $\theta$ are single-valued functions of $\theta$, the averages of $\bar{e}_I$ and $\bar{e}_Q$ taken over a very large number of cycles of the reference are:

(7)
$$<\bar{e}_I> = \int_{-\pi}^{\pi} \bar{e}_I(\theta)p(\theta)d\theta = \int_{-\pi}^{\pi} E\cos(\theta+\theta_0)p(\theta)d\theta$$

(8)
$$<\bar{e}_Q> = \int_{-\pi}^{\pi} \bar{e}_Q(\theta)p(\theta)d\theta = \int_{-\pi}^{\pi} E\sin(\theta+\theta_0)p(\theta)d\theta$$

Where $\theta_0$ is the phase angle between reference and input signal ($e_s$), and $\theta$ is a dummy variable in the integration, $\theta_0$ is assumed constant. Expanding (7) and (8):

(9)
$$<\bar{e}_I> = \cos\theta_0 \int_{-\pi}^{\pi} \cos\theta p(\theta)d\theta - \sin\theta_0 \int_{-\pi}^{\pi} \sin\theta p(\theta)d\theta$$

(10)
$$<\bar{e}_Q> = \sin\theta_0 \int_{-\pi}^{\pi} \cos\theta p(\theta)d\theta + \cos\theta_0 \int_{-\pi}^{\pi} \sin\theta p(\theta)d\theta$$

The second part of each expression vanishes because $p(\theta)$ is an even function of $\theta$ while sin $\theta$ is odd. The form of the remaining part shows that as $p(\theta)$ becomes more random, of the both $<\bar{e}_I>$ ad $<\bar{e}_Q>$ decrease in magnitude. This follows because more randomness in $p(\theta)$ implies a lower central peak and higher values in the skirts. In the absence of signal, any phase angle is equally likely, and $p(\theta)$ becomes a rectangular distribution with constant amplitude $1/2\pi$ over the interval $-\pi$, $+\pi$.

Thus, noise adds a significant bias to $\bar{e}_I$ or $\bar{e}_Q$ which the usual processes for noise reduction (for example, integration) will not remove. If $<\bar{e}_Q>$ is used alone as a phase indicator, the only value of phase which it can measure without distortion due to noise is zero phase, or 180°. Similarly if $<\bar{e}_I>$ is used alone, it can measure only 90° or 270° without distortion due to noise. In these particular cases, $<\bar{e}_I>$ and $<\bar{e}_Q>$ remain zero as $p(\theta)$ becomes more random. Thus a phase-measuring device based on either the in-phase or quadrature component must be a nulling device, as are all servo-mechanical phase-detectors. However, this limitation does not apply to a device which measures phase by examining the ratio of the in-phase and quadrature components. Taking the ratio of (10) and (9):

(11)
$$\frac{<\bar{e}_Q>}{<\bar{e}_I>} = \tan\theta_0$$

which is completely independent of $p(\theta)$.

It has previously been noted that the reference voltage wave forms need not be sinusodial. Several alternative wave forms may be used, and in fact, if a square wave is used, the relationship between the output voltage of the integrators and the phase becomes a linear function rather than a tangent function. Moreover, operation of the phase meter of the invention may be made entirely automatic by the insertion of additional relays. Such relays would operate momentarily, closing the switches 62 and 72 after energization of the threshold circuits. With each closing of these switches a new phase reading would be taken and one threshold relay could be utilized for imprinting the phase reading on a recorder.

Further modifications will suggest themselves to those skilled in the art. For example, the output meter 120 could be provided with a single scale to give unambiguous readings. With such a modification, lamps would not be energized, but the relays would add or subtract fixed voltages at the integrator output as well as invert the sign of the integrator output when such inversion is necessary.

The invention should not be limited to the details of the description of the preferred embodiment given below, but only by the spirit and scope of the appended claims.

What is claimed is:

1. Apparatus for the measurement of phase of an input signal comprising a source of a first reference voltage, a source of a second reference voltage, said first and second reference voltages being similar but in quadrature to each other, a first phase detector, means for applying said input signal and said first reference voltage to said first phase detector, a second phase detector, means for applying said input signal and said second reference voltage to said second phase detector, means for averaging the outputs of said first and second phase detectors and means for measuring the ratio of the average outputs of said first and second phase detectors, said ratio being proportional to the tangent of the phase angle of the input signal with respect to one of said reference voltages.

2. Apparatus for the measurement of phase of an input signal comprising two similar channels, one of said channels including a source of first reference voltage, a first phase detector, a first integrator, and means for applying said input signal and said first reference voltage to said first phase detector, the output of said first phase detector being applied to said first integrator, the other of said channels including a source of second reference voltage, said second reference voltage being similar to said first reference voltage but in quadrature thereto, a second phase detector, a second integrator, and means for applying said input signal and said second reference voltage to said second phase detector, the output of said second phase detector being applied to said second integrator, and means for measuring the ratio of the outputs of said first and second integrators to determine the tangent of the phase angle of said input signal with respect to one of said reference voltages.

3. Apparatus for the measurement of phase of an input signal comprising two similar channels, one of said channels including a source of first reference voltage, a first phase detector, a first integrator, and means for applying said input signal and said first reference voltage to said first phase detector, the output of said first phase detector being applied to said first integrator, the other of said channels including a source of second reference voltage, said second reference voltage being similar to said first reference voltage but in quadrature thereto, a second phase detector, a second integrator, and means for applying said input signal and said second reference voltage to said second phase detector, the output of said second phase detector being applied to said second integrator, a threshold device, means for connecting said first and second integrators to said threshold device, means for comparing the outputs of said first and second integrators with a predetermined voltage level in said threshold device, a meter for indicating phase displacement of said input signal, and switch means responsive to the output of said one integrator reaching a value less than said predetermined voltage level as the output of said other integrator reaches a value in excess of said predetermined voltage level for connecting the output of said one integrator to said meter.

4. Apparatus for the measurement of phase of an input signal comprising two similar channels, one of said channels including a source of first reference voltage, a first phase detector, a first integrator, and means for applying said input signal and said first reference voltage to said first phase detector, the output of said first phase detector being applied to said first integrator, the other of said channels including a source of second reference voltage, said second reference voltage being similar to said first reference voltage but in quadrature thereto, a second phase detector, a second integrator, and means for applying said input signal and said second reference voltage to said second phase detector, the output of said second phase detector being applied to said second integrator, a threshold device for producing two predetermined voltage levels of equal magnitude and opposite polarity, means for applying the outputs of said first and second integrators to said threshold device for comparison with said predetermined voltage levels, a meter for indicating phase displacement of said input signal, and switch means responsive to the output of said one of said integrators reaching a value less than one of said predetermined voltage levels as the output of the other of said integrators reaches a value in excess of, and is of the same polarity as, said one of said predetermined voltage levels for connecting the output of said one of said integrators to said meter.

References Cited by the Examiner

UNITED STATES PATENTS 3,054,064  9/1962  Sherman _____ 324—82
3,060,380  10/1962  Howells et al. _____ 324—82

WALTER L. CARLSON, *Primary Examiner.*

P. F. WILLE, *Assistant Examiner.*